United States Patent [19]
Göckelmann et al.

[11] Patent Number: 5,146,839
[45] Date of Patent: Sep. 15, 1992

[54] BREWING MEANS FOR A COFFEE MACHINE

[75] Inventors: Karl Göckelmann, Gerstetten; Rudi Geiger, Weissenstein, both of Fed. Rep. of Germany

[73] Assignee: WMF Württembergische Metallwarenfabrik AG, Geislingen/Steige, Fed. Rep. of Germany

[21] Appl. No.: 650,556

[22] Filed: Feb. 4, 1991

[30] Foreign Application Priority Data

Feb. 8, 1990 [EP] European Pat. Off. .......... 90102520

[51] Int. Cl.⁵ .............................................. A47J 31/00
[52] U.S. Cl. ...................................... 99/287; 99/297; 277/34
[58] Field of Search ................. 99/279, 287, 295, 297, 99/298, 300, 302 R; 277/205, 212 R, 34, 27

[56] References Cited

U.S. PATENT DOCUMENTS

| | | | |
|---|---|---|---|
| 3,138,942 | 6/1964 | Kayser .................................. | 277/205 |
| 3,384,004 | 5/1968 | Perlman et al. .................... | 99/302 R |
| 3,977,313 | 8/1976 | Bieri ..................................... | 99/297 |
| 4,205,598 | 6/1980 | Leuschner et al. ................. | 99/316 |
| 4,206,694 | 6/1980 | Moskowitz et al. ................ | 99/295 |

FOREIGN PATENT DOCUMENTS

| | | | |
|---|---|---|---|
| 0288899 | 11/1988 | European Pat. Off. ............. | 99/300 |
| 2856547 | 10/1980 | Fed. Rep. of Germany . | |
| 0197807 | 7/1978 | German Democratic Rep. ... | 99/279 |
| 0646712 | 12/1965 | Italy ..................................... | 99/298 |
| 1196587 | 12/1985 | U.S.S.R. ............................... | 277/34 |

*Primary Examiner*—Harvey C. Hornsby
*Assistant Examiner*—Reginald L. Alexander
*Attorney, Agent, or Firm*—Finnegan, Henderson, Farabow, Garrett & Dunner

[57] ABSTRACT

A brewing means (1) for a coffee machine with a brewing chamber (3) is described, which is disposed in a housing (2) provided with an opening (9) on a front side. The opening (9) can be closed by means of a closing element (10) sealed against the opening. A hot water line (11) is furthermore provided, which supplies hot brewing water to the brewing chamber (3) under pressure and supports at the same time the sealing of the opening (9). In order to design such a brewing means (1) in such fashion that the service life of the seal (21) can be increased, it is suggested that the seal (21) comprises a flexible membrane disposed between a sealing chamber (22) connected to the hot water line (11) and a sealing seat (19), which can be arched and pressed against the sealing seat by means of the pressure.

8 Claims, 2 Drawing Sheets

DETAIL A

DETAIL A

BREWING MEANS FOR A COFFEE MACHINE

BACKGROUND

The invention relates to a brewing means for a coffee machine of the type having a brewing chamber which is disposed in a housing provided with an opening at one side thereof, a closing element for closing the opening, a hot water line for supplying brewing water under pressure into the brewing chamber and a seal disposed between the closing element and the housing and extending around the opening, which seal can be pressed against a sealing seat by the pressure of the brewing water for sealing the opening.

Such a brewing means is known from DE-PS 25 43 227. The known brewing means comprises a closing element which is displaceable on the upper side of a housing of the brewing chamber. For this purpose, an annular flange surrounding the opening of the brewing chamber is disposed on the brewing chamber, over which guides of the closing element engage. For sealing, the closing element comprises a recess open in the direction towards the brewing chamber, in which a piston plate is accommodated. The cross-sectional surface of the recess is larger than the cross-sectional surface of the opening of the brewing chamber and has approximately the same size as the piston plate. However, the thickness of the piston plate is smaller than the depth of the recess. If the closing element is in its position closing the opening, the piston plate thus rests on the annular flange around the opening of the brewing chamber, while there is a gap between the upper side of the piston plate, which faces the brewing chamber and the bottom of the recess. The hot-water line for supplying the hot brewing water ends in this gap, there being passage openings in alignment with this aperture in the piston plate, through which the hot brewing water can be guided into the brewing chamber. A sealing ring of round cross-section is embedded in such fashion in a groove in the surface area of the piston plate resting on the annular flange that it still projects beyond the surface of the piston plate. The sealing ring is disposed somewhat offset towards the center so that the surface of the piston plate located within the sealing ring is smaller than the surface resting against the gap. In this fashion the piston plate acts as a step piston, in which the seal is pressed against the annular flange acting as a sealing seat under the action of the hot water pressure. However, so that it can act as a step piston there must not remain any gap between the sealing ring and its sealing seat on the annular flange, which permits a pressure compensation at the beginning of the hot water supply across the entire lower side of the piston plate. This means that the sealing ring slides on the annular flange upon each movement of the closing element loaded by the weight of the piston plate, which has a detrimental effect on its service life and causes moreover additional friction. The projecting sealing ring also disturbs in this case, if adhering coffee powder must be removed from the lower side of the closing element. Possibly used scraping instruments can get caught and damage the sealing ring. The sealing ring can fall out and get lost. The sealing ring must furthermore be lifted above the edge of the annular flange upon the movement of the closing element, the risk of its being damaged being further increased.

SUMMARY

Thus the invention is based on the object of constructionally developing a brewing means of the aforementioned type in such fashion that the service life of the seal is increased.

The object, in accordance with the present invention and as embodied and broadly described herein, is accomplished by providing a seal comprising a flexible membrane disposed between a sealing chamber connected with the hot water line and the sealing seat, which membrane can be arched and pressed against the sealing seat by means of said pressure.

The active surface of the seal can be disposed in rearwardly ofset fashion as far as or even behind the surface of the closing element by means of the development according to the invention so that the seal cannot be damaged neither during the cleaning process of the lower side of the closing element nor during a movement of the closing element. Nevertheless, the desired sealing effect is achieved immediately as soon as the hot brewing water is supplied to start a brewing process.

The hot water can be supplied to the pressure chamber in a constructionally simple fashion by the development that the sealing chamber and the seal are disposed on the closing element movable to close the opening.

The seal is imparted an especially good ability for arching when the seal comprises a substantially U-shaped cross-section with a web and two projecting lateral legs and that the sealing chamber is at least limited by the web, the web being adapted to be pressed with arching against the sealing seat.

A pressure reducer located in the flow path of the hot water downstream of the sealing chamber facilitates the placing of the seal at the beginning of the brewing process.

Having the pressure reducer comprise at least one opening whose total cross-section is smaller than the cross-section of the hot water line, provides a constructionally simple development of the pressure reducer.

The invention can be used especially advantageously in a brewing means with a closing element displaceable in a plane extending parallel to the opening of the housing of the brewing chamber. Because of this construction both the abrasion of the seal and the friction forces can be reduced.

The seal can be fastened to the closing element by means of a first and a second fastening flange. Also, the closing element can contain a cup-shaped housing with a hot water distributing sieve disposed in the interior and a pressure reducing plate. In this construction the first fastening flange is clamped between the pressure reducing plate and the cup-shaped housing and the second fastening flange is clamped between the hot water distributing sieve, and the pressure reducing plate. In this manner the assembly and possibly the exchange of the seal is substantially facilitated.

BRIEF DESCRIPTION OF THE DRAWINGS

An example of embodiment of the invention is explained in greater detail in the following by means of the drawings.

DESCRIPTION OF THE PREFERRED EMBODIMENT

Figure 1:
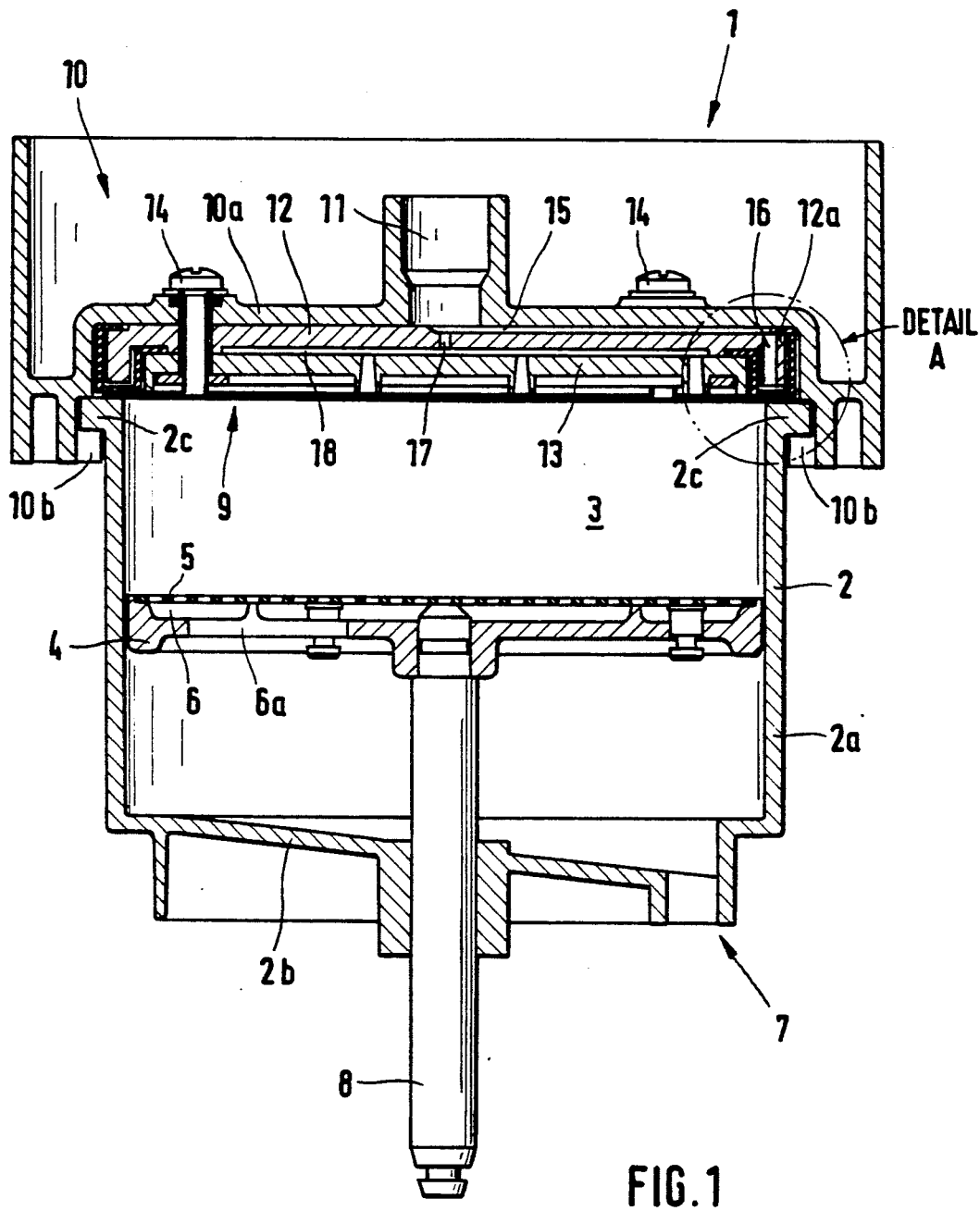
FIG. 1 shows a longitudinal section through a brewing means developed according to the invention.

A brewing means 1 can be recognized in FIG. 1 as it is used in conventional coffee machines, e.g. in coffee machines working automatically or semiautomatically. The brewing means 1 has a brewing chamber 3 accommodated in a housing 2, whose volume can be increased or reduced by means of a piston 4 which can be moved up and down. A brewing strainer 5 is fastened to the upper side of the piston 4 facing the brewing chamber, whose openings are communicating with a beverage collecting chamber 6 provided in the piston 4 and with the lower side of the piston 4 via openings 6a. The housing 2 comprises a bottom 2b which is inclined in the direction towards a coffee discharge opening 7. The coffee discharge opening 7 is connected with a discharge (not shown) of the coffee machine in known fashion. The piston is moved by a conventional gear (not shown) via a piston rod 8.

The housing comprises an opening 9 at its top opposing the bottom 2b, which is surrounded by an annular flange 2c of the housing 2. A closing element 10 is provided above the opening 9, which comprises a substantially cup-shaped housing 10a and engages under the annular flange 2c on two opposite sides of the opening 9 with lateral guides 10b in such fashion that the closing element 10 can be displaced in a direction vertical to the plane of the drawing with respect to the brewing chamber 3. The cup-shaped housing 10a of the closing element 10 is traversed by a hot water line 11, which is connected in customary fashion with a hot-water apparatus (not shown) of the coffee machine. A cup-shaped pressure reducing plate 12 is disposed in the cup-shaped housing 10a of the closing element 10 and one of the customary hot water distributing sieves 13 is disposed in the cup-shaped reducing plate 12. The pressure reducing plate 12 and the distributing sieve 13 are firmly clamped with the cup-shaped housing 10a by means of screws 14. The cup-shaped pressure reducing plate 12 has an edge 12a projecting in the direction towards the brewing chamber, which is located substantially above the annular flange 2c, when the closing element 10 closes the opening 9.

A groove 15 is disposed on the upper side of the pressure reducing plate 12 facing the housing 10a, which extends from the hot water line 11 up into the area of the edge 12a and ends there in a bore 16, which traverses the edge 12a in the direction towards the annular flange 2c.

An opening 17 is furthermore provided in the pressure reducing plate 12, which leads from the hot water line 11 into a hot water distributing chamber 18, which is provided above the distributing sieve 13 and which extends almost across the entire surface of the distributing sieve 13. The cross-section of the opening 17 is substantially smaller than the cross-section of the hot water line 11 so that the opening 17 acts as pressure reducing opening upon the passage of the hot water from the hot water line 11 into the distributing chamber 18 and from there into the brewing chamber 3, while the groove 15 and thus the bore 16 are acted upon with the full hot water pressure.

Figure 2:
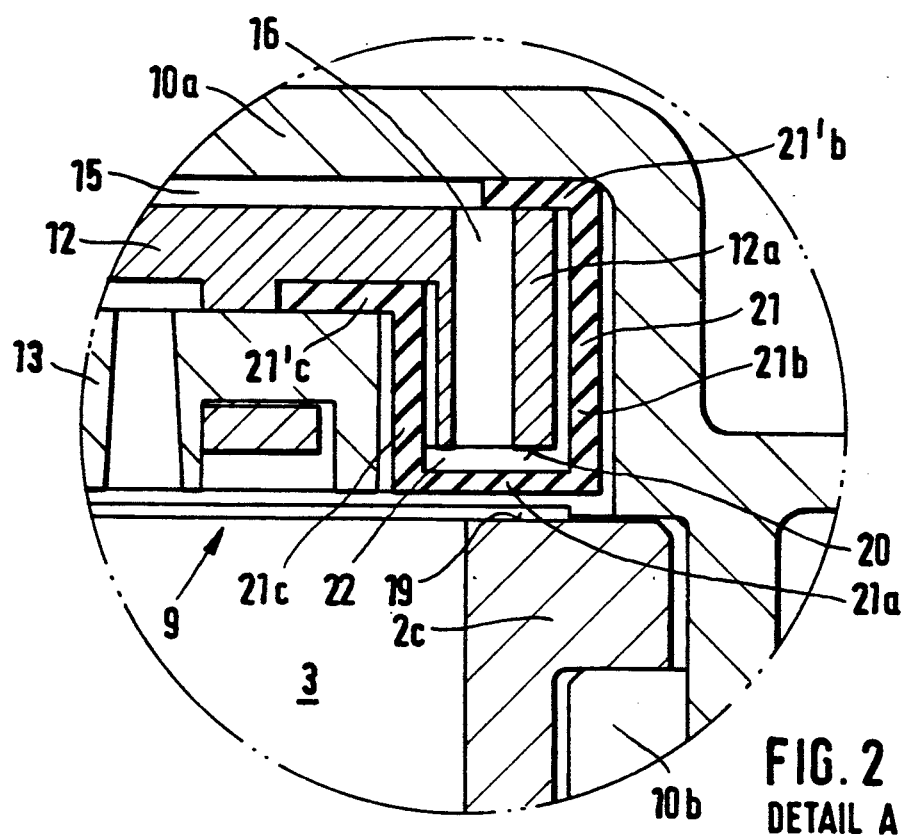
FIG. 2 is an enlarged representation of the detail A of FIG. 1.

As is shown by the enlarged individual representation in FIG. 2, the edge 12a of the pressure reducing plate 12 is somethat offset unwardly with respect to the surface of the distributing sieve 13 adjoining the brewing chamber so that a gap remains between a surface of the annular flange 2c designed as sealing seat 19 and pointing in the direction of the closing element 10 and a surface 20 of the edge 12a of the edge 12a pointing downwardly in the direction of the sealing seat 19 and traversed by the bore 16. A seal 21 designed as a thin, flexible membrane is disposed in this gap. The seal 21 has a substantially U-shaped cross-section with a lower web 21a extending in a straight line in underformed non-sealing position and two upright legs 21b and 21c. The lower web 21a covers the discharge hole of the bore 16. One of the legs 21b extends between the edge 21a and the cup-shaped housing 10 into the housing 10a with a distance at both sides and ends in a fastening flange 21'b, which is clamped between the pressure reducing plate 12 and the housing 10a. The other leg 21c extends upwardly between the edge 12a and the distributing sieve 13 with a distance at both sides and ends in a fastening flange 21'c, which is received in a groove and is clamped between the distributing sieve 13 and the pressure reducing plate 12.

The web 21a is disposed in such fashion in the gap that its surface pointing in the direction of the sealing seat 19 does not project beyond the surface of the distributing sieve 13, which adjoins the brewing chamber 3 and is spaced a distance from the sealing seat 19 in the underformed non-sealing position. A further distance is provided between the web 21a and the surface 20, which serves as sealing chamber 22. As it is drawn, the web 21 can be located above the brewing chamber 3 with an area which is smaller that half its width. However, the seal 21 extends as a complete ring around the entire circumference of the opening 9. Depending upon the constructional possibilities only a single groove 15 and a single bore 16 may be provided, the sealing chamber 22; however, extending around the opening 9.

Figure 3:
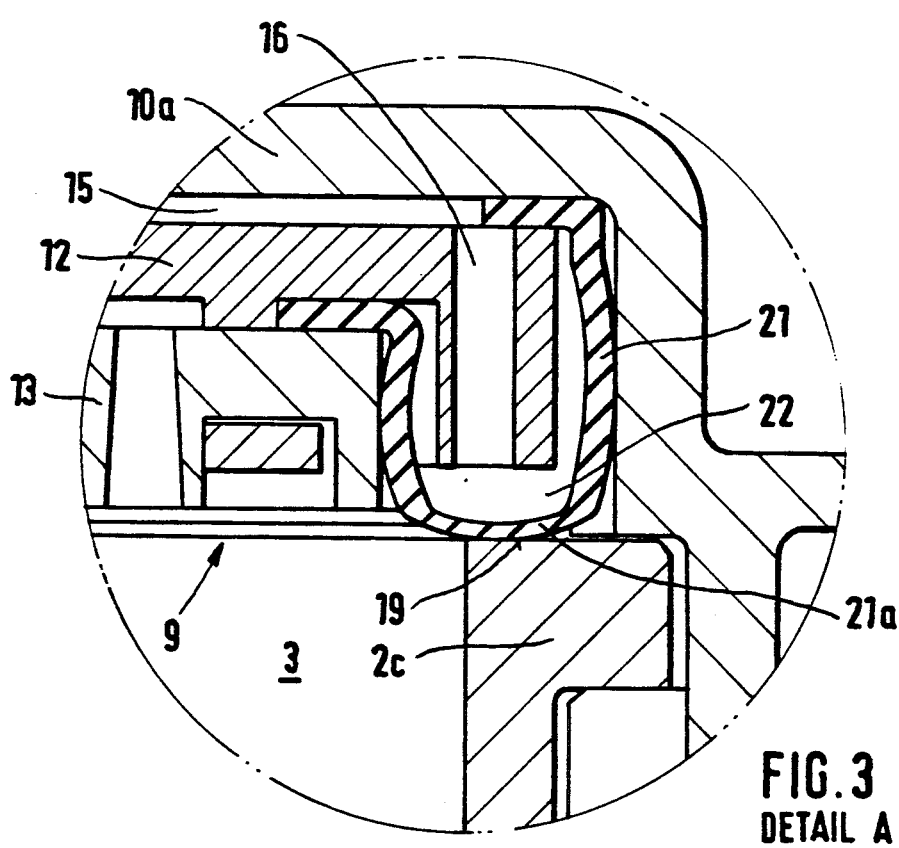
FIG. 3 is a representation similar to that of FIG. 2 with applied seal.

The hot brewing water supplied during a brewing process via the hot water line 11 under pressure enters first into the sealing chamber 22 via the groove 15 and the bore 16 and acts in particular on the web 21a with increased brewing pressure. The brewing pressure arches the web 21 of the seal 21 around the opening 9 in the fashion drawn in FIG. 3 so that it rests against the sealing surface 19 in elastically deformed sealing fashion.

The opening 17 acts as screen which only allows a slow passage of the brewing water into the brewing chamber 3. Since the coffee discharge 7 also provides for a certain pressure reduction in the brewing chamber 3, it is ensured that the pressure in the sealing chamber 22 exceeds the pressure in the brewing chamber 3 at least during the brewing process. If the supply of the hot water is stopped after the completion of the brewing process, the pressure in the sealing chamber 22 can be reduced via the opening 17 so that the web 21a returns from the underformed non-sealing shown in FIG. 3 into the position shown in FIG. 2 under the effect of its inherent elasticity.

Modifying the described and drawn example of the embodiment the seal may e.g. also be disposed on the housing and the sealing seat may be provided on the closing element. A deviating cross-section or a profiling of the seal is also conceivable, as long as a sealing effect by an arching elastic seal deformation ensured. The pressure reducing plate can moreover have several openings, their total cross-section having, however, to be smaller than the cross-section of the hot water line. Although the seal according to the invention has especially advantageous effects when used in a brewing means with displaceable closing element, it can also be used in differently constructed brewing means, e.g. with a closing element which can be lowered and placed on the brewing chamber from above.

We claim:

1. Brewing apparatus for a coffee making machine, comprising a housing defining a brewing chamber, the brewing chamber housing having an opening at an upper end thereof; a closing element adapted to close said opening; a hot water conduit being fluidly connected by a flow path to said brewing chamber for supplying pressurized hot water to said brewing chamber for brewing ground coffee disposable in said brewing chamber; seal means being disposed between said closing element and said housing, said seal means extending around said opening of said brewing chamber housing for sealing said brewing chamber, said seal means including a seal member disposed on one of said closing element and said housing, and a sealing seat attached to the other of said closing element and said housing, said seal member including a flexible membrane defining with said one of said closing element and said housing, a sealing chamber, at least a wall portion of said sealing chamber facing toward said sealing seat being formed by said flexible membrane; and a channel connecting said sealing chamber to said supply conduit for subjecting said sealing chamber and said flexible membrane to said pressure of said hot water, said flexible membrane being elastically deformable towards and pressed against said sealing seat by said hot water pressure.

2. The brewing apparatus according to claim 1, wherein the flexible membrane is disposed on the closing element, said closing element being movable relative to said housing to close the opening, and wherein the sealing seat is disposed on the housing.

3. The brewing apparatus according to claim 1, wherein the seal member comprises a flexible membrane forming a substantially U-shaped cross-section and having a web and two projecting lateral legs and that the sealing chamber is at least limited by the web, the web being adapted to be elastically arched against the sealing seat.

4. The brewing apparatus according to claim 1 further comprising a pressure reducer located in the flow path of the hot water downstream of the sealing chamber channel.

5. The brewing apparatus according to claim 4, wherein the pressure reducer includes at least one opening whose total flow cross-section is smaller that the flow cross-section of the hot water conduit.

6. The brewing apparatus according to claim 1, wherein the closing element is displaceable in a plane extending in parallel to the plane defined by the opening of the housing of the brewing chamber.

7. The brewing apparatus according to claim 2, wherein the seal member includes a first and a second fastening flange for fastening to said closing element.

8. The brewing apparatus according to claim 7, wherein the closing element includes a cup-shaped housing, a hot water distributing sieve disposed in the interior of said cup-shaped housing, and a pressure reducing plate, the first fastening flange being clamped between the pressure reducing plate and the cup-shaped housing and the second fastening flange being clamped between the hot water distribution sieve and the pressure reducing plate.

* * * * *